UNITED STATES PATENT OFFICE.

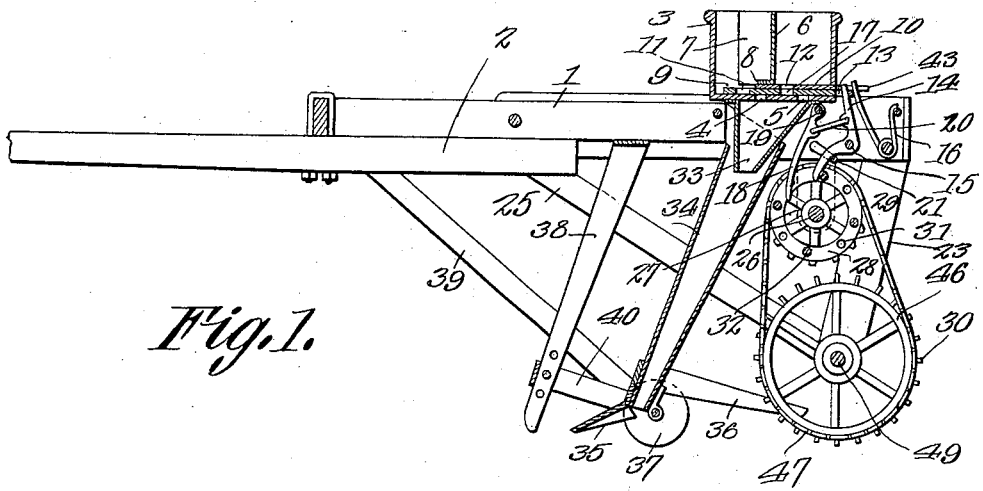

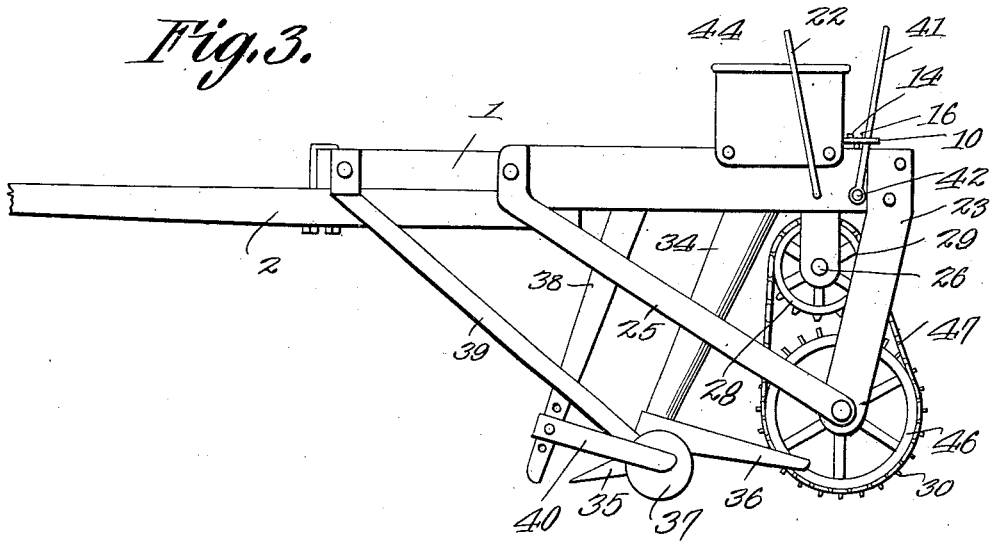
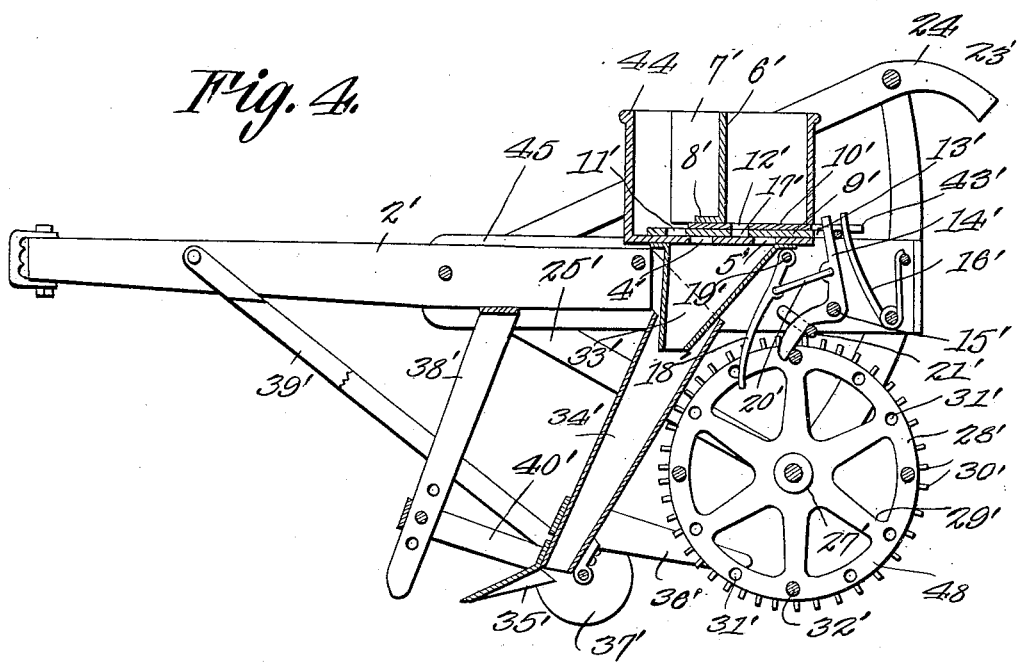

JOSIAH DAY BLADES, OF BRACKEN COUNTY, KENTUCKY.

COMBINED PLANTER AND FERTILIZER-DISTRIBUTER.

1,065,427. Specification of Letters Patent. Patented June 24, 1913.

Application filed May 13, 1912. Serial No. 697,028.

*To all whom it may concern:*

Be it known that I, JOSIAH D. BLADES, a citizen of the United States, residing in the county of Bracken and State of Kentucky, have invented a new and useful Combined Planter and Fertilizer-Distributer, of which the following is a specification.

This invention relates to a combined planter and fertilizer distributer, one of its objects being to provide a simple and inexpensive machine of this character having means whereby the distance between hills can be readily regulated.

A further object is to provide improved means whereby the depth of the furrow can be regulated.

Another object is to provide means for removing from the path of the furrow opener all stones and trash so that when the seed is covered, nothing but well broken or pulverized soil will be in the furrow.

Another object is to provide means whereby power may be transmitted from one of the supporting wheels to the dropping mechanism, one of the power transmitting elements constituting means for engaging the soil and for preventing dirt from clogging between the teeth of the drive wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a central vertical longitudinal section through the machine, said section being taken on the line A—B Fig. 2. Fig. 2 is a plan view of the machine. Fig. 3 is a side elevation. Fig. 4 is a view similar to Fig. 1 but showing a modified structure.

Referring to the figures by characters of reference 1 designates a frame secured to the rear end portion of a beam 2 and mounted on the sides of this frame are boxes 3 the bottom of each of which is preferably provided with a front outlet 4 and a rear outlet 5. As both boxes are of the same construction and provided with the same valve mechanism, only one will be described.

A partition 6 is removably mounted within the box and is preferably formed with side wings 7 adapted to bear laterally against the side walls of the box so as thus to hold the partition against accidental displacement. A ledge 8 is formed at the lower edge of the partition and arranged between this ledge and the bottom of the box are slides 9 and 10 arranged one upon the other. The lower feed slide 9 is provided with spaced openings 11 and 12 and has an aperture 13 in one end thereof for the reception of the upper arm of a bell crank lever 14. This bell crank lever is fulcrumed, as at 15, between the side members 1. A spring 16 is mounted between the side members and bears against the slide 9 close to the aperture 13 and serves to hold said slide normally pressed forward within the box 3 and with its openings 11 and 12 out of register with the openings 4 and 5. The upper slide, which constitutes a regulating means, is provided with a single opening 17, the distance between this opening and the forward end of the cut-off slide 10 being less than the distance between the openings 11 and 12. Thus it will be seen that when the opening 17 is registering with the opening 12, the opening 11 will be exposed beyond the front end of the cut-off slide 10.

A locking finger 18 is pivotally mounted, as at 19, between the side members 1 and hangs downwardly below and in front of the bell crank lever 14, there being a link connection 20 between this finger and the upper arm of the lever 14.

A crank 21 is interposed between the side members 1 and a lever 22 is connected thereto and constitutes means for rotating the same. This crank extends under the lower arm of the lever 14 so that, when lever 22 is drawn rearwardly, the crank will push against the lower arm of the lever 14 and elevate it. At the same time the upper arm of the lever will pull backwardly on the slide 9 and, through the link 20, upon the finger 18.

A shaft 26 is journaled upon the frame and mounted on this shaft is a hub 27 having spaced rims 28 connected thereto by means of spokes 29. One of these rims is preferably provided with teeth 30 for engaging a chain 47. Hangers 23 extend downwardly from the frame 1 and downwardly and rearwardly extending braces 25 are secured to the frame and to the lower ends of the standards. A shaft 49 extends through the rear end portions of the braces 25 and through the lower ends of the hangers 23 and secured to this shaft is a supporting wheel 46 in the form of a sprocket which is engaged by the chain 47. With this construction it will be apparent that when the machine is moved forward, motion will be transmitted from sprocket 46 through the chain 47 and the toothed rims 28 to shaft 26. Furthermore the sprocket will come directly into contact with the soil and will operate to keep the teeth of the soil engaging sprocket clear of dirt which might otherwise clog them. It is to be understood of course that the shaft 26 extends under both boxes and through both hubs 27.

A series of openings 31 are formed within the rims 28 and tripping pins 32 are adapted to be placed in any of these openings. The lower end of the bell crank lever 14 extends between the rims 28 and into the path of the pins and the finger 18 likewise extends into the path of said pins.

An outlet spout 33 is fixedly connected to the bottom of the box 3 and discharges into a boot 34 which is likewise fixedly mounted and is extended in front of the wheel. A furrow opener 35 extends forward from the lower end of the boot and sweeps, scrapers or coverers 36 extend laterally and rearwardly from the lower portion of the boot. Disks 37 are journaled at the sides of the boot and constitute means for directing soil back into the furrow and onto the seed and fertilizer deposited through the boot 34.

A colter blade 38 extends downwardly from the frame 1 and in front of the furrow opener 35 and extends between two closely fitting brace strips 39 which connect the beam 2 to the lower portion of the boot 34 and serve to hold the boot against displacement. Rearwardly diverging sweeps 40 are connected adjustably to the lower portion of the colter 38 and constitute means for clearing away trash or the like from the path of the furrow opener.

The upper slide 10 is engaged by a shifting lever 41 pivotally mounted as at 42, upon one of the side members 1. This upper slide has a longitudinal slot 43 in the rear end thereof through which the lever 14 and the spring 16 project. By providing this slot the two slides 10 and 9 can be shifted independently. Thus it will be seen that by actuating the lever 41, the slide 10 can be shifted longitudinally so as to partly or entirely expose the openings 11 and 12 when slide 9 is in its normal position. Obviously, therefore, the amount of seeds and fertilizer directed into the openings 11 and 12 can be easily controlled.

In using the apparatus the seeds to be planted are placed in one of the compartments in each box 3 while the fertilizer is placed in the other compartment. As shown in Fig. 1 slide 9 normally closes the openings 4 and 5. After the pins 32 have been so placed as to trip the lever 14 at desired intervals, the apparatus is drawn forward and each trip as it moves forward, while passing over the axle 26, presses against the lower arm of lever 14 and pushes it forward. The upper arm of the lever therefore pulls backwardly on the slide 9 and causes said slide to carry to the openings 4 and 5 any material which may have been deposited in the openings 11 and 12. This movement of the slide places spring 16 under stress and, as soon as the pin 32 passes the lower end of lever 14, spring 16 returns the lever and the slide to their initial positions. The return movement is facilitated by the pin 32 striking against the lower end portion of finger 18 and causing said finger to pull, through link 20 upon the upper end portion of the lever 14. The material discharged through the openings 4 and 5 will drop into spout 33 and thence into the boot 34. The colter blade 38 cuts into the soil in advance of the furrow opener 35 and the sweeps 40 serve to clear away trash lying in the path of the machine. The furrow opener 35 cuts into the soil and the seeds and fertilizer discharged into the boot drop into the furrow thus produced. Disks 37 then act to cover the seeds and fertilizer.

Should it be desired to stop the operation of the machine suddenly, lever 22 is drawn backwardly by the operator. The crank 21 is thus caused to push forwardly upon the lower arm of lever 14 so as to shift it out of the path of the pins 32. At the same time link 20 pulls rearwardly on the finger 18 and said finger is caused to bind against the lower end of lever 14. This finger is thus held in the path of the pins 32 and further rotation of the wheel is prevented.

As soon as the lever 22 is released the wheel is free to rotate again.

Instead of using a two row machine such as hereinbefore described, a one row machine such as shown in Fig. 4 may be employed. This modified structure includes side members 45 mounted on a beam 2′ and carrying a box 44. The arrangement of slides and mechanism for actuating the same, is the same as that hereinbefore described only, instead of utilizing a sprocket as a soil engaging wheel and transmitting motion from said sprocket to a wheel 28, a wheel 48′ of large dimensions may be substituted for the wheel 28 and arranged to directly engage the soil as shown in Fig. 4.

In all other respects the mechanism hereinbefore described is duplicated in this modified structure. It might be stated that in this modified structure, the hangers 23 are preferably extended upwardly to form standards 23′ to which are connected handles 24.

What is claimed is:—

1. A planter including a seed box having an outlet, a wheel mounted for rotation thereunder, a feed slide, a lever for actuating the same, adjustable means carried by the wheel for engaging and actuating the lever, a pivoted member extending into the path of said means, and a pivotal connection between said lever and member for causing them to move simultaneously in opposite directions.

2. A planter including a seed box having an outlet, a wheel mounted for rotation thereunder, a feed slide, a lever for actuating the same, adjustable means carried by the wheel for engaging and actuating the lever, a pivoted member extending into the path of said means, a pivotal connection between said lever and member for causing them to move simultaneously in opposite directions, and means under the control of the operator for shifting said lever and member toward each other to hold the wheel against rotation.

3. A planter including a seed box having an outlet, a wheel mounted for rotation thereunder, a spring pressed feed slide, a lever for actuating the same, means carried by the wheel for intermittently engaging and actuating the slide, a cut-off slide adjustably mounted on the feed slide, a soil engaging wheel having peripheral teeth, and a power transmitting chain engaging the teeth on the said wheel and the first named wheel.

4. A planter including a seed box having an outlet, a wheel mounted for rotation thereunder, a feed slide, a lever for actuating the same, adjustable means carried by the wheel for engaging and actuating the lever, a pivoted member extending into the path of said means, a pivotal connection between said lever and member for causing them to move simultaneously in opposite directions, a crank engaging the lever, and means for rotating the crank to shift the lever and member toward each other.

In testimony that I claim the foregoing as my own, I have hereto affixed my signature in the presence of two witnesses.

JOSIAH DAY BLADES.

Witnesses:
W. H. STEVENSON,
A. A. HILES, Jr.

Copies of this patent may be obtained for five cents each, by addressing the "Commissioner of Patents, Washington, D. C."